Aug. 21, 1928.
L. F. MOODY
1,681,705
HIGH SPEED IMPULSE TURBINE
Filed May 25, 1923 4 Sheets-Sheet 1
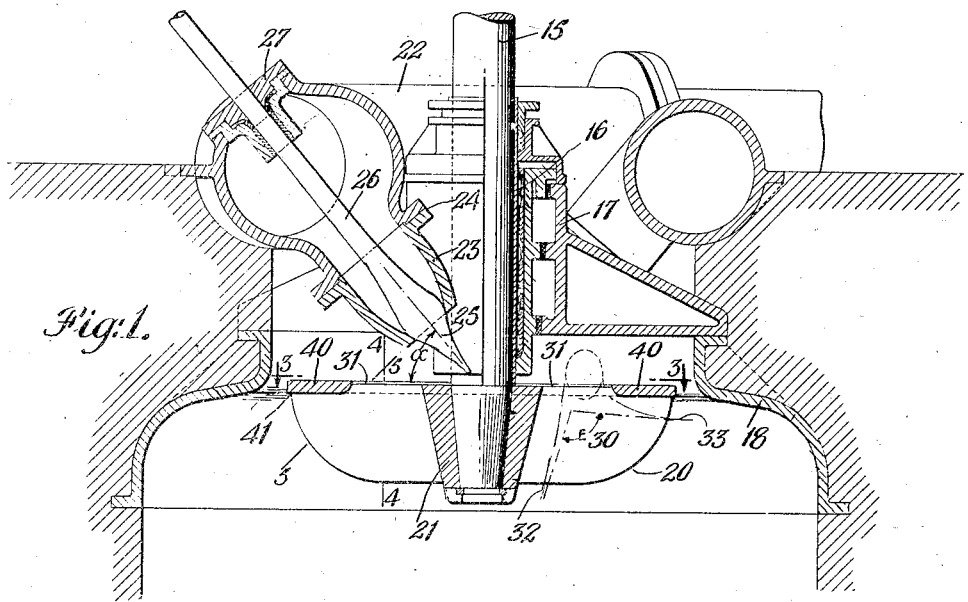
INVENTOR
Lewis F. Moody
BY
Edwards, Sager & Bower
his ATTORNEYS

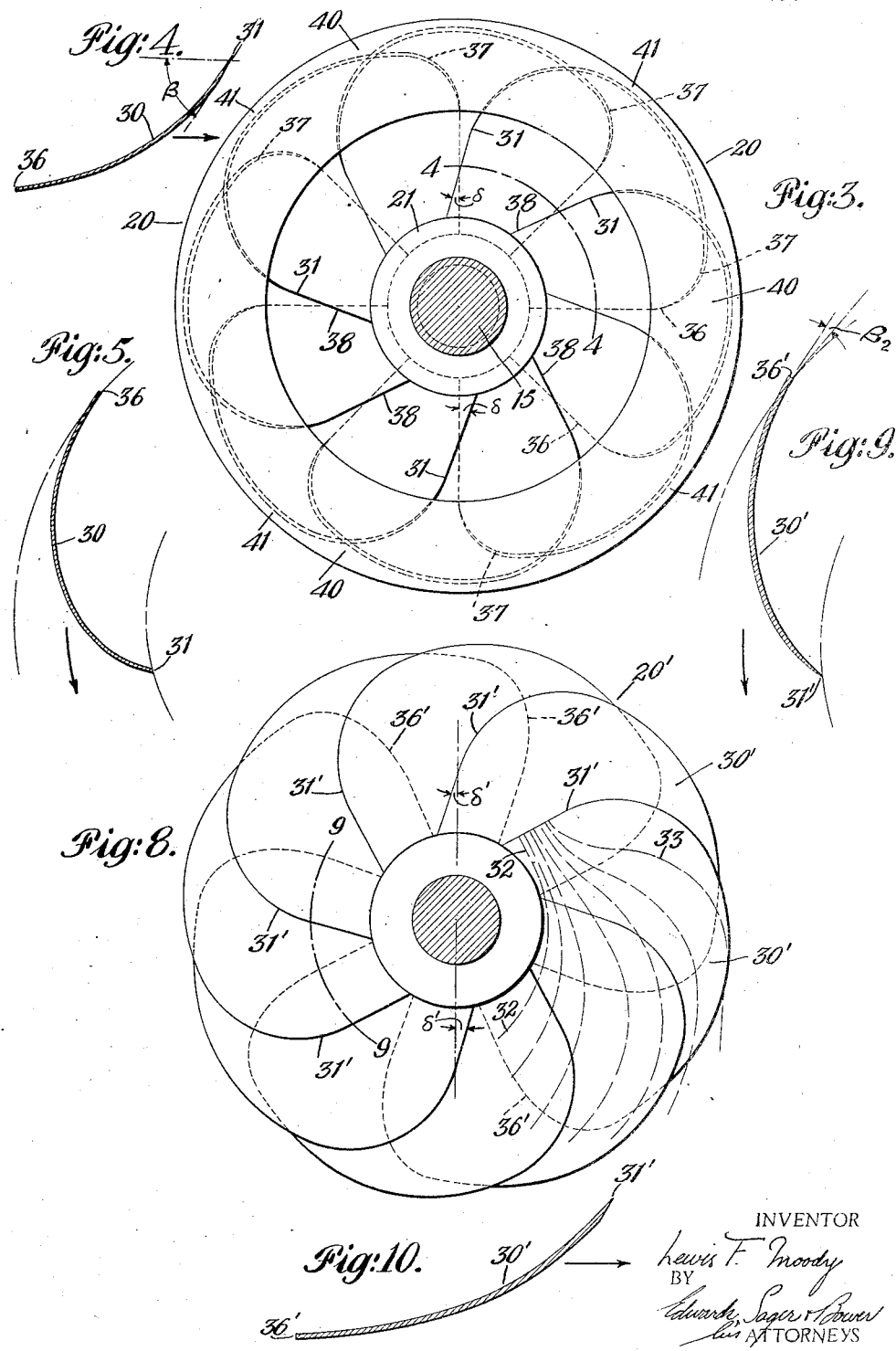

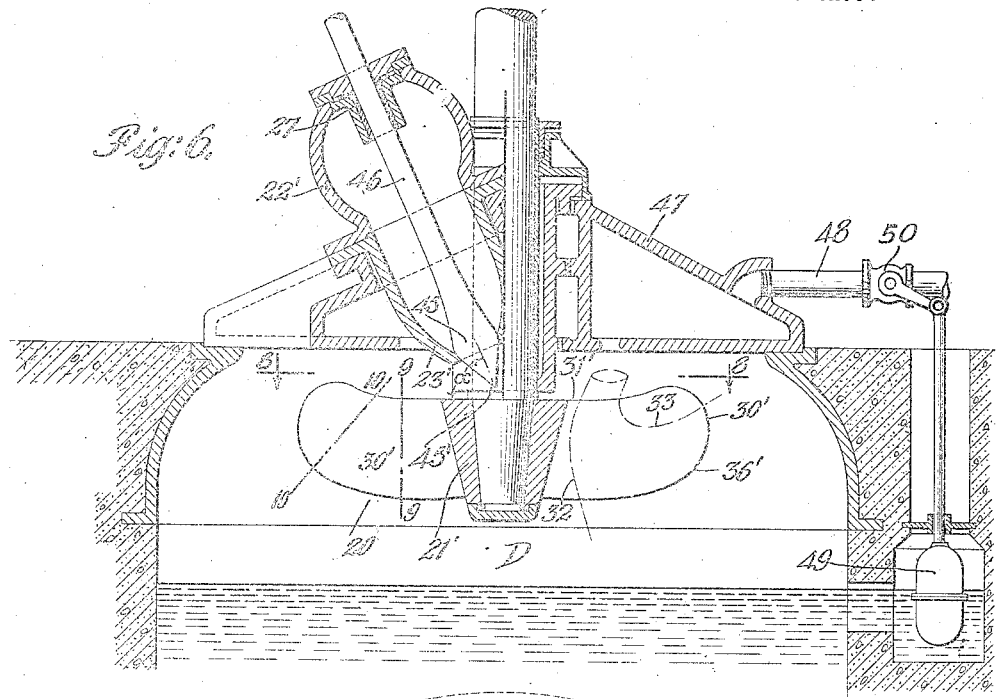
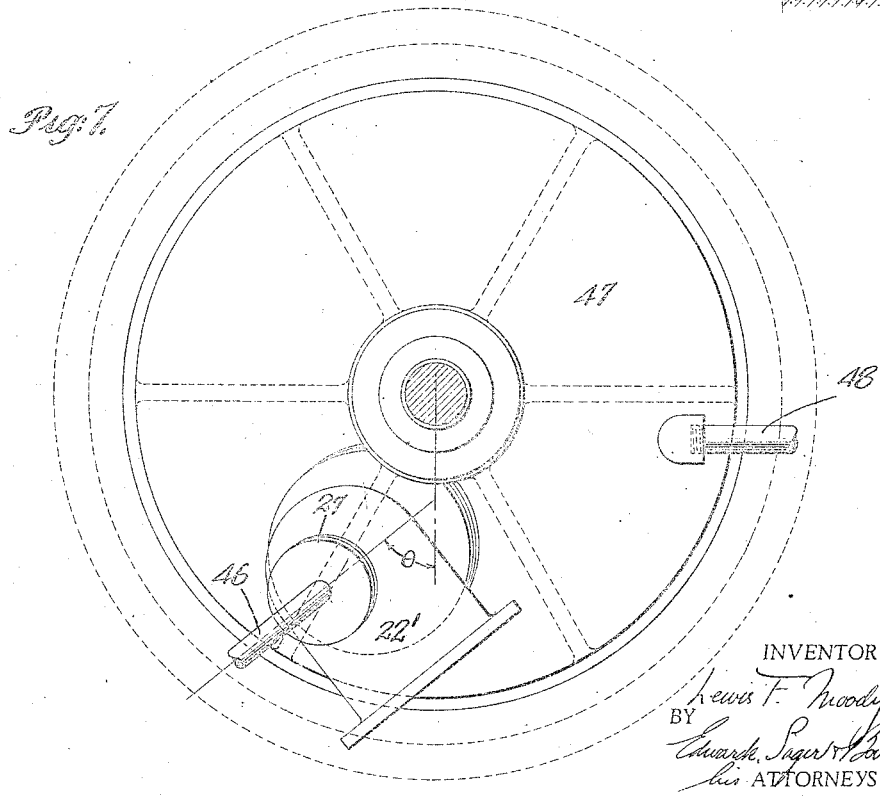

Aug. 21, 1928.
L. F. MOODY
1,681,705
HIGH SPEED IMPULSE TURBINE
Filed May 25, 1923   4 Sheets-Sheet 4
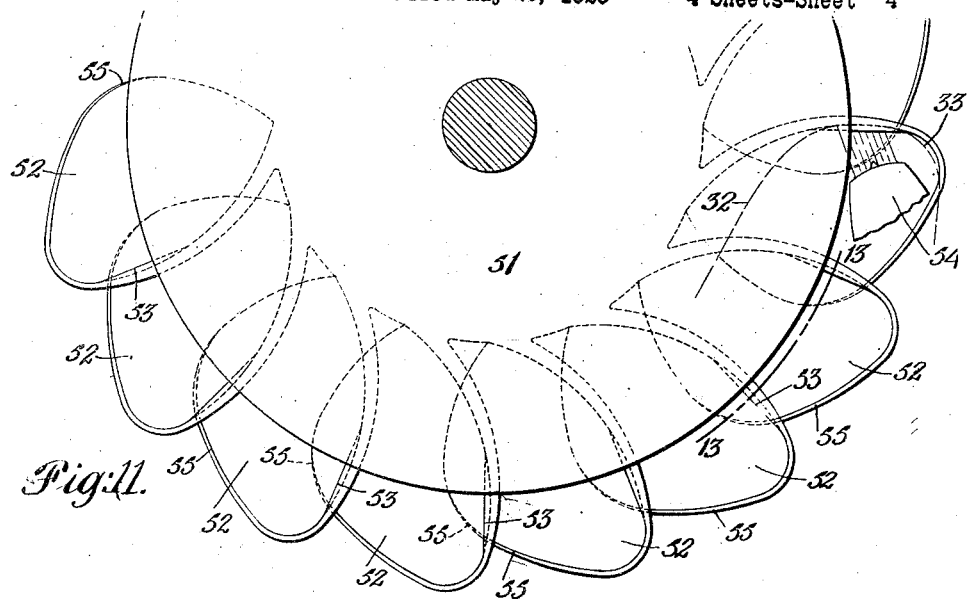
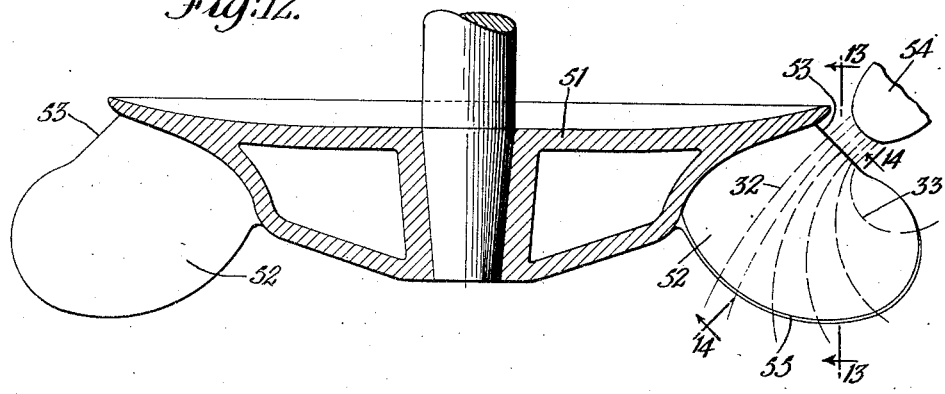
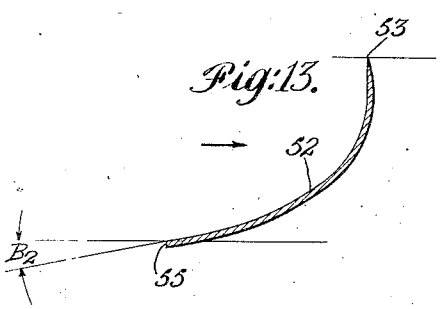
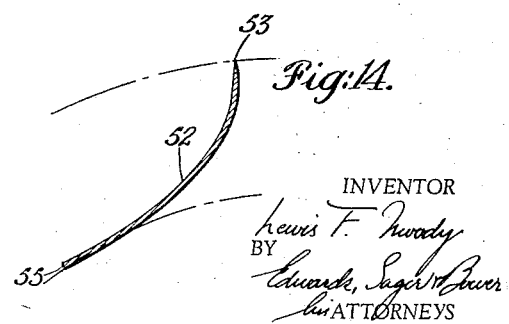
INVENTOR
Lewis F. Moody
BY
Edwards, Sager & Buer
his ATTORNEYS Patented Aug. 21, 1928.

1,681,705

UNITED STATES PATENT OFFICE.

LEWIS FERRY MOODY, OF PHILADELPHIA, PENNSYLVANIA.

HIGH-SPEED IMPULSE TURBINE.

Application filed May 25, 1923. Serial No. 641,318.

This invention relates to impulse turbines in which the jet stream is received on one side of the runner buckets and passed through the buckets and discharged from the opposite side. The object of the invention is to provide such a turbine adapted for high specific speeds and high efficiency.

Further objects of the invention particularly in the formation of the buckets to receive and efficiently to spread and to deflect a jet stream having initially a high meridian component of velocity will appear from the following description taken in connection with the accompanying drawings in which Fig. 1 is a vertical sectional view through a vertical shaft downward discharging turbine embodying the invention.

Fig. 2 is a plan view of the same.

Fig. 3 is a plan view of the runner taken on line 3—3 of Fig. 1.

Fig. 4 is a sectional development of a runner bucket of Fig. 1 taken along the cylindrical surface 4—4 of Figs. 1 and 3.

Fig. 5 is a sectional development of a runner bucket of Fig. 1 taken along a conical surface indicated by line 5—5 of Fig. 1 and coaxial with the runner.

Fig. 6 is a vertical sectional view similar to Fig. 1 but illustrating another turbine embodying the invention.

Fig. 7 is a plan view of the turbine shown in Fig. 6.

Fig. 8 is a plan view of the runner of Fig. 6 taken on line 8—8 of Fig. 6.

Fig. 9 is a sectional development of a bucket of the Fig. 6 runner taken along the cylindrical surface indicated by lines 9—9 of Figs. 6 and 8.

Fig. 10 is a sectional development of a bucket of the Fig. 6 runner taken along a conical surface indicated by line 10—10 of Fig. 6 and coaxial with the runner.

Fig. 11 is a plan view of a portion of runner and nozzle illustrating a further modification.

Fig. 12 is a vertical sectional view of the runner shown in Fig. 11.

Fig. 13 is a sectional development of a bucket of the Fig. 11 runner taken on the cylindrical surface indicated by lines 13—13 of Figs. 11 and 12, and Fig. 14 is a sectional development of a bucket of the Fig. 11 runner taken on the conical surface indicated by line 14—14 of Fig. 12 and coaxial with the runner.

In the specific embodiment of the invention shown in Fig. 1 a vertical shaft 15 runs in bearing 16 supported by the casting 17 having radial arms resting on the casing 18 set in the foundation. At its lower end the shaft 15 carries the runner 20 having a small hub portion 21.

The water is brought in through the curved pipe 22 feeding four similar nozzles 23 connected at 24 to the under portion of said pipe 22. Each nozzle is provided with an adjustable needle 25 having its stem 26 extending out through the packing gland 27 at the top of the pipe 22 and these stems 26 are adapted to be connected to any desired adjusting means to control the adjustment of the needles 25 and regulate the size of the jets.

Each jet as viewed in a vertical plane containing the jet axis makes an angle $\alpha$ with the horizontal direction of movement of the runner buckets and this angle $\alpha$ is in the turbine of this invention relatively large so that the jet entering the buckets has a large axial component. In the turbine shown in Figs. 1 to 5 this angle $\alpha$ is preferably between 45° and 60°.

The buckets 30 of runner 20 are gradually curved or without abrupt curvature and are only moderately concave on their faces as indicated in Figs. 4 and 5 with their entrance edges 31 inclined forward in the direction of rotation of the runner and their discharge edges 36 nearly tangent to the direction of movement of the buckets. The buckets thus have a direction to conform at their entrance edges 31 with the relative velocity of water impinging on them in a direction containing a backward component, that is, a component opposite to the direction of rotation of the runner. The buckets 30, therefore, are so inclined when considered in a section containing the stream lines that the entrance portion of their faces makes an angle of less than 90° with the tangential direction as indicated by the angle B, in Fig. 4. The formation of the buckets is such that the jet impinging along a relatively small length of the entrance edge 31 is spread out into a thin sheet as it passes through the bucket, this spreading of the flow being indicated by the jet lines sketched in Fig. 1 and showing these lines as diverging at an angle $\epsilon$ of at least 70° to each other. The meridian components of velocity of the inner lines 32 of the flow through the buckets are nearly axial in direction or with a small inward component and the meridian components of the outer flow lines 33 turn from an axial direction at entrance to a substantially radial direction at discharge. Between these extremes the jet spreads out against the surface of the bucket in fan-shape so as to be in the form of a thin widely extended sheet at the discharge. This lateral spreading of the jet permits the use of a low discharge velocity from the runner and avoids undue loss of energy in the velocity head of the water leaving the runner. In this way the efficiency of the turbine is maintained by utilizing the energy of the flow in the buckets and leaving comparatively little in the discharge from the buckets. The flow in the runner 20 is guided by the bucket surfaces without coming into contact with the hub surfaces. The buckets, eight in number in the runner shown, have a relatively small inclination to the horizontal so that there is a comparatively large rotational movement of the bucket for each increment of movement of the jet flow and the specific speed is high. The buckets 30 also are wide from entrance edge 31 to discharge edge 36 and each bucket viewed axially (Fig. 3) at its outer portion overlaps two adjacent buckets as indicated at 37 and at its inner portion overlaps four adjacent buckets as indicated at 38, each bucket occupying about 90° of the projected circular area of the runner in plan view.

The horizontal component of the jet velocity at the point of entrance to the runner is substantially tangential i. e. at right angles to a radius through this point and the axis of the runner (see Fig. 2) so that the angle $\theta$ is substantially 90°. The entrance edges 31 of the buckets, however, incline at an angle $\delta$ to radii of the runner, the inner ends of these edges being angularly in advance of the outer edges in the direction of rotation so as to counteract the tendency of the jet to disperse radially outward as it enters the runner. This formation of the bucket edge 31 and the shaping of the remainder of the bucket as shown in Figs. 4 and 5 effect a gradual spreading and deflection of the jet in the bucket along smoothly curving lines and in efficient manner. The outward lateral spreading of the jets in the buckets also leaves the upper outer ends of the buckets free for attachment to a shroud ring 40 when desired to increase the strength of the runner and reduce the windage loss at the bucket edges. This shroud ring 40 is substantially radial along the upper ends of the buckets so as to fit within the laterally curving outlines of the jet. The discharge edges 36 of the buckets are substantially radial at their inner portions and at their outer portions curve forward and upward to merge into the under surface the shroud ring 40 at the point 41 thus giving a great length to this discharge edge and corresponding large spread of the jet at discharge from the runner.

In the turbine of Figs. 6 to 10 the jet is directed inwardly at the entrance to the runner so that the angle $\theta$ between the horizontal component of the jet and the radius is less than 90° (see Fig. 7). This inward inclination of the jet aids in counteracting the tendency of the jet in the runner to disperse radially outward particularly in turbines of very high specific speed. In the high speed runner of this modification the buckets 30' are still wider from entrance 31' to discharge 36' than are the buckets of Fig. 1 and are so formed as to cause the jet in the runner to turn slightly outward at its inner portion 32 and turn outward and upward at its outer portion 33, spreading out in a thin sheet between these extremes (see Fig. 8). The entrance edge 31' is inclined a small angle $\delta'$ to the radial direction and the relatively flat shape of the bucket curvature is shown in the developed sections of Figs. 9 and 10.

As the jet traverses the runner the bucket 30 is continually in rotation and if the entrance edge 31 of the bucket, as viewed in Figs. 3 or 8 for example, were normal to the absolute direction of the jet when the jet first impinges on these edges, this edge and the remainder of the bucket surface would continually rotate so that the surface having this general direction would become considerably inclined to the direction of motion of the jet and would naturally tend to deflect the jet radially outward. In addition to this, the line of flow of the jet would naturally carry it continually further from the axis. If the bucket 30 were so formed, there would therefore be a great tendency for the jet to be deflected outward and to flow principally through the outer portion of the bucket at discharge. In order to distribute the flow properly and to counteract this tendency, the entrance edges 31 of the buckets, and with them the elements of the bucket surface as cut by planes normal to the axis, are given a decided inclination to the radial direction, as shown by the angles $\delta$ and $\delta'$ in Figs. 3 and 8. This direction tends to deflect the jet inwardly toward the axis and to oppose the action described above, thus giving a more uniform distribution of flow at the discharge 36 from the bucket and enabling the discharging jet to be formed into a wide and thin stream inclined at a small direction to the tangent at discharge. When the jet is so widened at discharge, the inner portions will flow in a nearly axial or even slightly inward direction, while the outer portions will discharge in a direction having a decided outward radial component. A relatively low velocity of discharge is essential to high efficiency if the major portion of the kinetic energy of the entering water is to be converted into useful work, since the velocity head of the discharging water represents practically a complete loss. It is therefore essential to discharge the water from the runner with its relative direction inclined at a small angle to the tangent in order that its absolute velocity shall be small. In the turbine of this invention, the practice which has sometimes been used of directing the water to the runner in a tangential or nearly tangential direction and with a small meridian component of velocity is discarded. One of the features of this turbine is therefore the entrance of the water into the runner with a greater meridian velocity than it possesses at discharge.

In this turbine only one nozzle 23′ is shown receiving the flow from an elbow 22′ and provided with a needle 45 having its stem 46 extending outward through the packing gland 27 to any suitable control means. The outer end of the needle 45 instead of being curved into the axial direction at its point is brought to a substantial conical point 45′ so that the flow lines of the jet at this point have definite inward components bringing the lines of the jet together without any central disturbance or the tendency to form a central area of air bubbles or disturbed conditions. The jet will therefore be formed as a solid clear rod with no separation out of the air at the center and the tendency of such separation to corrode the needle point and runner edges will therefore be avoided. The jet is formed by discharging an annular stream of water in a converging diagonal direction with respect to the axis so that it forms a conical stream converging toward the axis. The stream then merges and turns through an angle of less than 90° into the axial direction. As shown in Fig. 6, the deflector is a cone forming the end of the needle 46, the sides of which are inclined to the axis at an angle of between 25 and 30°, that is, the elements of the cone subtend an angle of between 50° and 60° with each other at the apex.

In the turbine of Fig. 6 the bearing-supporting casting 47 forms a substantial air tight cover for the runner space below it. Air is supplied to this runner space through the pipe 48 controlled by any suitable valve means 50 which valve means is preferably connected to the float member 49 in such a way that when the level of the water in the draft tube D rises the supply of air will be increased so as to increase the pressure in the runner chamber and prevent the level of the draft tube water from reaching the runner. The pressure in the runner chamber will thus be maintained below atmospheric by the static pressure of the column of water in the draft tube D above the level of tail water. This utilization of a vacuum in the runner chamber and the attainment of this vacuum by the static head of the column of water in the draft tube may be applied to any of the turbines of this invention.

In the turbine runner of Fig. 6 the shroud ring is omitted and the relatively short blunt point of the needle 45 permits the nozzle 23′ to be positioned closer to the entrance edges of the runner buckets. The small hub 21′ of the runner and the inward inclination of the jet as shown by angle $\theta$ combine to give a high speed of rotation to the runner. The axis of the jet also has a large angle relative to a horizontal plane, this angle $\alpha$ being well above 45° and preferably between 60° and 80°. In a turbine of this modification extremely high specific speeds are attainable while the efficiency is maintained by the shaping of the buckets to give the wide and smooth spreading of the flow through the runner as indicated between the inner and outer portions 32 and 33.

In the modification shown in Figs. 11 to 14 the runner hub 51 carries at its peripheral portion the unshrouded buckets 52 having entrance edges 53 in nearly radial planes and inclined downwardly and outwardly as shown in Fig. 12 so as to extend substantially at right angles to the meridian components of the jet. The jet from nozzle 54 has its axis inclined downward and inward and in the buckets 52 the jet lines are spread out laterally into thin sheet form at the discharge edge 55 of the bucket. The inner lines of flow 32 are turned slightly toward the axial and the outer lines of flow 33 are turned around toward radial and with a slight upward component. Between these two extremes the jet is spread out in thin sheet form enabling it to be discharged in a direction nearly tangential with respect to the runner, that is, with a small angle $\beta_2$ (see Fig. 13), so that there is little velocity head left in the discharge from the runner.

I claim:—

1. In an impulse turbine a runner having buckets and a nozzle for directing a jet against the bucket edges at one side of said runner, said buckets spreading said jet so that at the discharge the meridian components of the outer and inner portions will be at an angle of between 70° and 180° to each other.

2. In an impulse turbine a runner having buckets and a nozzle for directing a jet against the bucket edges at one side of said runner, said buckets spreading said jet so that at the discharge the meridian components of the outer and inner portions will be at right angles to each other.

3. In an impulse turbine a runner having buckets and a nozzle for directing a jet against the bucket edges at one side of said runner at an angle of over 45° to the plane of the runner, said buckets spreading said jet so that at the discharge the meridian components of the outer and inner portions will be at an angle of between 70° and 180° to each other.

4. In an impulse turbine a runner having buckets with entrance ends inclined forward in the direction of rotation of the runner, and a nozzle for directing a jet against the bucket edges at one side of said runner at an angle of over 45° to the plane of the runner, said buckets spreading said jet so that at the discharge the meridian components of the outer and inner portions will be at an angle of between 70° and 180° to each other.

5. In an impulse turbine means forming a cylindrical jet and directing it against the turbine runner, and a runner having buckets formed with curved surfaces receiving said jet on one side, spreading it laterally without contact with hub or shroud surfaces and discharging it at the opposite side of said runner.

6. In an impulse turbine means forming a cylindrical jet and directing it against the turbine runner and with a radially inward component of velocity at the entrance to the runner, and a runner having buckets formed with curved surfaces receiving said jet on one side, spreading it laterally without contact with hub or shroud surfaces, and discharging it at the opposite side of said runner.

7. In an impulse turbine means for forming a cylindrical jet and directing it against a runner from one side thereof and with an inward component of velocity at the point of entrance to the runner, and runner buckets receiving said jet on one side and spreading it laterally and discharging it at the opposite side.

8. In an impulse turbine means for forming a cylindrical jet and directing it against a runner from one side thereof and with an inward component of velocity at the point of entrance to the runner, and runner buckets receiving said jet on one side and spreading it laterally and discharging it at the opposite side, said jet being inclined at an angle of more than 45° to the plane of said runner.

9. In an impulse turbine means for forming a cylindrical jet and directing it against a runner from one side thereof and with an inward component of velocity at the point of entrance to the runner, and runner buckets receiving said jet on one side and spreading it laterally and discharging it at the opposite side, said runner buckets having entrance edges inclined forward in the direction of rotation of the runner.

10. In an impulse turbine means for forming a cylindrical jet and directing it against a runner from one side thereof and with an inward component of velocity at the point of entrance to the runner, of unshrouded runner buckets receiving said jet on one side and spreading it laterally and discharging it at the opposite side.

11. In an impulse turbine means for forming a cylindrical jet and directing it against a runner from one side thereof and with an inward component of velocity at the point of entrance to the runner, and runner buckets receiving said jet and spreading it and turning it outward.

12. In an impulse turbine means for forming a cylindrical jet and directing it against a runner from one side thereof and with an inward component of velocity at the point of entrance to the runner, and runner buckets receiving said jet and spreading it and turning it outward and discharging it with axial and outward components of velocity.

13. In an impulse turbine a runner having buckets and a nozzle for directing a jet against the bucket edges at one side of said edges, said buckets spreading said jet into sheet form at the discharge edges and each bucket overlapping two adjacent buckets at its outer portions.

14. In an impulse turbine a runner having buckets and a nozzle for directing a jet against the bucket edges at one side of said edges, said buckets spreading said jet into sheet form at the discharge edges and each bucket overlapping two adjacent buckets at its outer portions and four adjacent buckets at its inner portions.

15. In a free jet turbine, in combination, a runner and means for admitting water thereto in cylindrical jet formation with axial and tangential velocity components, said runner having buckets so inclined at entrance and discharge that the meridian component of velocity will be less at discharge than at entrance.

16. In a free jet turbine, in combination, a runner and means for admitting water thereto in cylindrical jet formation, said means and the buckets of said runner being so directed that the absolute direction of the flow entering the runner is inclined to the tangential at a greater angle than the relative direction of discharge from said runner.

17. In an impulse turbine a runner having buckets and a nozzle for directing a jet against the bucket edges at one side of said runner, said nozzle having a centrally disposed needle and being adapted to receive the water in a direction parallel to the needle axis, the tip of said needle being formed with a conical surface the sides of which converge at an angle with each other until they meet in a point and said nozzle being spaced a relatively small distance away from the entrance edges of said buckets to provide a minimum length of free path for said jet.

18. In an impulse turbine means for forming a cylindrical jet comprising a needle nozzle in which the flow enters the nozzle in a direction parallel to the needle axis, and in which the needle tip is formed with walls conically converging to a point at an angle of at least 25 to 30° to the axis.

19. In a free jet turbine in combination a runner and means for directing the water into said runner in cylindrical jet formation, said means and the buckets of said runner being so directed that the angle $\beta_2$ included between the direction of the vane at discharge and the direction of motion of the bucket is small in comparison with the angle included between the direction of the vane at entrance and the direction of motion, said entrance angle being measured on the forward side of the vane.

20. In a free jet turbine in combination a runner having buckets, and means for directing the water into said runner in cylindrical jet formation comprising a nozzle having a relatively short blunt needle and receiving the water in a direction parallel to the needle axis, said nozzle having its axis directed by a relatively large absolute angle to the direction of motion of the buckets so that said nozzle is located in close proximity to the entrance edges of the buckets.

21. In an impulse turbine the combination with means for forming a cylindrical jet, of a chamber into which said jet is discharged, a vertical shaft runner within said chamber and having buckets receiving said jet and spreading and turning it outward and discharging it in a generally downward direction, over a relatively large area of the discharge chamber, the level of the discharged fluid thereby being disposed substantially parallel to and below a plane containing said runner and normal to the axis thereof, and air supply means to said chamber adjustable to control the pressure therein so that said parallel relation will be maintained.

22. In an impulse turbine the combination with means for forming a cylindrical jet, of a chamber into which said jet is discharged, a vertical shaft runner within said chamber and having buckets receiving said jet and spreading and turning it outward and discharging it in a generally downward direction, over a relatively large area of the discharge chamber, the level of the discharged fluid thereby being disposed substantially parallel to and below a plane containing said runner and normal to the axis thereof, and air supply means to said chamber automatically controlled by the level of water within said chamber so that said parallel relation will be maintained.

23. In an impulse turbine the combination with a vertical shaft rotor, of cylindrical solid jet forming means directing the jet downward on to the rotor blades which spread and turn the jet outward and in a generally downward direction over a relatively large area of a discharge chamber enclosing said rotor and jet, whereby the level of the discharged fluid will be disposed substantially parallel to and below a plane containing said runner and normal to the axis thereof, and air supply means above said rotor adjustable to control the pressure in said chamber so that said parallel relation will be maintained.

24. In an impulse turbine the combination with means for forming a plurality of cylindrical jets, of a chamber into which said jets are discharged, a vertical shaft runner within said chamber and having buckets receiving said jets and spreading and turning the same outward and discharging the same in a generally downward direction over a relatively large area of the discharge chamber, the level of the discharged fluid thereby being disposed substantially parallel to and below a plane containing said runner and normal to the axis thereof, and air supply means to said chamber adjustable to control the pressure therein.

LEWIS FERRY MOODY.